Patented Feb. 4, 1941

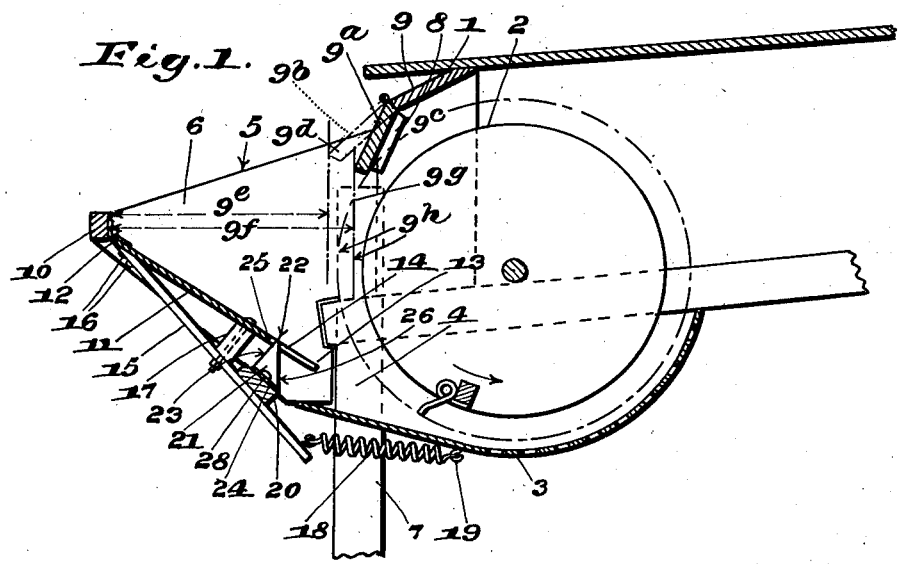

2,230,329

UNITED STATES PATENT OFFICE 2,230,329

FEEDER

Carl R. Livermon, Roxobel, N. C.

Application July 15, 1939, Serial No. 284,791

8 Claims. (Cl. 130—30)

This invention relates to improvements in threshing machinery, and more particularly to the apparatus for feeding materials thereinto. The instant feeder is useable in conjunction with a fairly wide range of the foregoing materials, but inasmuch as it is primarily intended for use on a peanut vine thresher the description is thus confined with the reservation previously suggested.

The current practice in feeding a peanut vine threshing machine is to employ laborers respectively to fork the vines onto a feed table and to stuff the vines into the throat of the picking cylinder. The latter practice carries with it the inaccuracies of human judgment because at times excess quantities of vines will be fed in, resulting in choking the picking cylinder while at other times sparse quantities will be fed in resulting in an underfeeding of the threshing machine.

This lack of uniformity in the feeding operation is noticeably corrected by making the picking cylinder responsible in a large measure for its own feeding. In other words, the vines are forked up to the feeding device, as in current practice, but the picking cylinder is made to coact with the feeder in such a way as to automatically supply itself, this going on indefinitely as long as the laborer on the ground keeps supplying the material. This underlying principle desirably and necessarily has associated features of no little importance. One of these features is the automatic retardation of the vine material, and the prevention of clogging of the instrumentality which does the retarding. With this preamble in mind the objects of the invention are as follows:

First, to provide a feeder for peanut vine and similar threshers, wherein the free end of a movable hopper bottom is slotted in from the edge to coact with the pitched portions of a series of comb teeth to automatically comb out any accumulation of vine material or other obstruction from the slots that would interfere with the free operation of the movable hopper bottom.

Second, to provide a comb and movable hopper bottom combination wherein the comb teeth when made as blades are constructed in the form of a right angled triangle, the back of which is perpendicular to the base, working close to the inner terminals of the slots to constantly exercise a cleaning function therefor when said bottom is in motion, the pitched edges or hypotenuses automatically pushing accumulations rearwardly and out of the open slot entrances when the bottom is lowered.

Third, to provide a closely combined picking cylinder and movable hopper bottom wherein the free end of said bottom is so closely spaced from the periphery of the cylinder that the pull by said cylinder teeth upon the vine material will be responsible for a depression of the bottom, thereby to expose more tooth length above the bottom and so automatically retard the material as the tendency to pull an excess becomes more pronounced.

Fourth, to provide a feeder of the character last defined, wherein the contiguity of the free end of the hopper bottom to the periphery of the picking cylinder makes possible the elimination of a rake or an equivalent thereof for the infeeding of the vine material.

Fifth, to provide a comb for the foregoing purpose of cleaning out the open-ended slots in the movable bottom, which may optionally comprise the blades previously described, or spring teeth which are angled at their ends to have the same effect as the pitched edges of said blades.

Other objects and advantages will appear in the following specification reference being had to the accompanying drawing, in which:

Figure 1 is a sectional view of the feed end of a peanut vine threshing machine, particularly illustrating the combination of the improved feeder with the picking cylinder.

Figure 2 is a rear elevation of the structure shown in Fig. 1.

Figure 3 is a perspective view of the stationary comb.

Figure 4 is a diagram illustrating the automatic clearing action later referred to.

Figure 5 is a detail view illustrating the substitution of spring teeth for the blades previously shown.

Figure 6 is a detail plan view showing the tooth and slot arrangement.

It is thought unnecessary to illustrate more of the threshing machine than is shown in Figs. 1 and 2. Here the thresher is generally designated 1. The picking cylinder 2 is to be regarded as a diagrammatic representation because it is lacking in the majority of the details which characterize this element of the apparatus. For example, all of the teeth have been omitted excepting one, this showing being sufficient to convey the idea of the cylinder. The same omission is carried out in respect to the concave 3 with which the cylinder 2 coacts in tearing the vine material that is fed in at the throat 4.

A feed hopper 5 is located directly in front of the picking cylinder 2. This hopper includes the sides 6 which, because of their nearness to the uprights 7 of the thresher frame, are secured directly to the thresher frame, and include battens 8 (Fig. 1). These battens are employed for the support of a deflector board 9 which is desirably set at a pitch and includes a hinged section 9a which is adapted to gravitate to a resting position upon portions of the battens 8. The board 9 is located closely to the roof of the thresher and its purpose is to deflect downwardly into the hopper 5 any of the material which the teeth of the cylinder might tend to throw backwardly. The section 9a stands at a sharp angle in respect to the horizontal plane so that any vine material otherwise tending to lodge on the deflector will readily slide off, but more particularly to normally dispose the free end of the hinged section so close to the cylinder teeth as to barely clear them. This in turn materially increases the size of the hopper entrance over what it would be if the section 9a were a rigid extension of the board 9 as at 9b, so fixed as to preserve a uniform radial distance 9c. In that case the free end 9a would stand out farther from the cylinder to provide adequate clearance for an occasional lump of material which at the same time would diminish the size of said entrance to the dimension 9e.

This objectionable effect is avoided by extending the section 9a down into the hopper as far as feasible, thus increasing the size of the hopper entrance to the dimension 9f, and the purpose of hinging the section is to insure its yielding in case a lump of material is carried over by the cylinder teeth. There is another important result from disposing the hinged section as stated because by doing so a considerable portion of the cylinder tooth area is exposed for immediate action upon the incoming material.

A vertical plane indicated by the line 9g and touching the foremost edge of the extension 9a intersects the tooth area and denotes the chord of a segment or arc 9h of the cylinder tooth area. Inasmuch as said tooth area segment falls directly in the hopper area 9f it is readily seen that the vine material will be treated at once and said treatment will not be defeated as could be the case if it were first held off by the projection 9d and had to pass thereunder before the tooth area would be reached.

A timber 10 constitutes the connector of the hopper sides 6. The latter are shaped like triangles, and the timber 10 goes across from tip to tip. A very important purpose of the timber 10 is to provide the support for a movable bottom 11. This comprises the bottom of the hopper 5, and it is made movable by the hinges 12, the leaves of which are secured to the bottom and to the timber. That end of the bottom 11 to which the hinges are secured is herein known as the hinge end, and it is desired to state that the hinges do not have to be precisely at the very end. There are occasions when the hinging is done down from the end, and in order to anticipate possible variations in this respect it is chosen to define the movable support as being situated adjacent to one end.

The opposite end designated 13 in Fig. 2 is known as the free end. This end is slotted in at 14. The slots are open at the free end for the important purpose of permitting the working out of any accumulation that might occur therein. This working out is facilitated by flaring the slots as shown in Fig. 2.

An arm 15 is secured to the bottom 11 adjacent to the hinges 12 as at 16, then extended downwardly in diverging relationship to the bottom 11, this relationship being maintained by a spacer 17. The bottom end of the arm 15 has one end of a spring 18 attached to it, the other end of the spring being anchored at 19.

The constant tendency of the spring 18 is to swing the movable bottom 11 upwardly into the hopper 5. This tendency to swing is limited by a bar 20 which is fixed at its ends to some convenient support, for example to the edges of the hopper sides 6. The placing of the hinges 12 and the depth of the spacer 17 are so arranged that when the spring 18 draws the arm 15 up into contact with the bar 20, the bottom 11 will stand at a tangent to the periphery of the cylinder 2, or substantially so. This tangential relationship of the bottom 11 to the cylinder 2 is accentuated by the fact that the bottom 11 is located as near to the cylinder 2 as is ordinarily practicable.

This nearness of location disposes the previously mentioned free end 13 closely contiguous to the periphery of the cylinder. The slotted free end virtually projects into the throat 4. This arrangement is responsible for the automatic functioning of the cylinder 2 in causing the depression of the movable bottom 11 by the act of pulling in the vine material. In other words, it is the pulling act which is a function of the picking cylinder 2, that causes the depression of the movable bottom 11, and not primarily the weight of the material on said bottom.

In addition to its function as a stop for the arm 15 the bar 20 provides a mount for a plurality of blades 21. In effect the combined bar 20 and blades 21 constitute a comb, the bar being the back and the blades the teeth. The latter are in registration with the slots 14. The tips 22 of the blades are normally flush with the top surface of the bottom 11. But as the latter is depressed, the teeth show above the bottom 11 more and more, extending farther through the slots 14 to provide an increasingly potent retarding means for the vine material as the cylinder 2 tends to pull in an excess.

The so-called comb does not necessarily comprise teeth in the form of the blades 21. Several equivalents of said blades can be employed as is presently illustrated in respect to Figs. 5 and 6. Said blades 21 or their equivalents are necessary for the performance of the foregoing retarding function and the slots 14 are necessary to accommodate the blades. But rather than to have the slots closed, which arrangement has a serious disadvantage, the ends of the latter are left open as brought out before, and this permits an automatic expulsion of accumulations which inevitably occur in the trailing ends of the slots.

Toward this end each blade is made in the form of a right angled triangle. The front 23 which is perpendicular to the base 24 will be positioned closely to the closed end of the respective slot 14. This practically eliminates the possibility of material accumulating at this particular point. But if material should accumulate at this point, the fact that the slot end 25 and the blade front 23 are virtually parallel, the motion of the bottom 11 will result in a sawing out of the presumed accumulation so as to keep the respective slot clear adjacent to the front 23.

The hypotenuse 26 of the triangular blade 21 provides a sharp pitch which exercises a cam action on any material that may have accumulated in the respective slot in back of the blade. In Fig. 4 the supposed accumulation is designated 27. This may comprise a matted portion of vine material, or perhaps a heavy piece of stalk or a stone. It would be generally undesirable to have the slot clogged in this way, and if the slot were other than open the clogging might interfere with the proper functioning of the movable bottom 11.

But when the bottom moves downwardly to the dotted line position a (Fig. 4) the angular motion of the slot 14 in reference to the respective blade 21, causes the accumulation 27 to ride against the sharp pitch 26. Instead of the accumulation 27 jamming in the slot it is worked out to the position b (Fig. 4) whence it will either fall off or stand ready to be pushed out in a later depression of the bottom.

The specific manner in which the blades 21 are made is of little consequence. A simple construction comprises the formation of a suitable length of metal sheared off at the ends (Fig. 3) to produce the right angled triangular shapes. The piece is then bent to define a base portion and the latter is secured at 28 to the comb bar 20 either by bolts or screws.

Reference was previously made to the substitution of an equivalent for the blades 21 as comprising spring fingers. These are illustrated in Figs. 5 and 6 wherein they are generally designated 29. The spring fingers are made in pairs (Fig. 6), each individual spring finger including a coil 30 and a U-connector 31. The connectors of the series of teeth are fastened to the bar 20 by clips 32. These bridge the U-portions of the pairs of teeth and are secured to the bar by a bolt 33 or an equivalent therefor, in the manner illustrated in Fig. 6.

It is to be observed particularly in Fig. 5 that the free ends 34 of the spring fingers are bent at a pitch to the shanks 35 of the fingers. The pitched ends agree in function and virtually in position to the hypotenuses 26 of the blades 21. The purpose of the pitched ends is to exercise a cam action on any accumulation in the slots 14, precisely as previously described in conjunction with Fig. 4.

The coils 30 impart a degree of resilience to the spring fingers. Consequently the spring fingers are capable of yielding to some extent at least as distinguished from the rigidity of the blades 21. But the yielding quality of the spring fingers 29 is not apparent to such a degree that it will frustrate the automatic clearing function of the slots 14 in the event of an obstruction riding down against the pitched ends upon a depression of the movable bottom 11.

The operation is already well understood from the previous description and is merely supplemented by the statement that the pull upon the vine material by the picking cylinder 2 occurs very strongly in the throat 4. Inasmuch as the hopper 5 is mounted directly adjacent to the picking cylinder 2 it can be clearly seen that the free end 13 of the movable bottom 11 which virtually and necessarily projects into the throat 4 must respond to this pull by a depressing action.

The tension of the spring 18 is so gauged that it will resist an initial range of pulls. In other words, the bottom 11 is not intended to be depressed by the lightest possible pull on the material by the cylinder 2 because if the bottom were made subject to a function as light as this, it would also give way under the superimposed weight of the material in the hopper.

This is definitely intended to be avoided. The cylinder 2 will pull on the material until a tendency to clog occurs. It is then that the spring 18 will yield and let the pull which reduces the infeeding of an excess of material to press the free end 13 down. The blades 21 or the spring finger 29 if substituted, then come into evidence, progressively retarding the material as the excessive infeeding increases. The revoluble picking cylinder 2 is thus responsible for an automatic self regulation of the infeeding of the material.

I claim:

1. A feeder comprising a hopper including a bottom having a hinge end and a free end, a revoluble picking cylinder, hinge means supporting said hinge end whereby to closely space said free end from the periphery of said cylinder, said bottom being slotted in from said free end, means tending to turn said bottom on its hinge support to advance said free end directly toward the cylinder periphery so that the pull by the cylinder upon vine material crossing the bottom will depress the bottom against the effort of said turning means, and a comb stationed beneath said free end, having teeth in registration with said slots and appearing progressively higher above said bottom and through said slots as the cylinder pull increases upon said material.

2. In a feeder, the combination of a revoluble picking cylinder, a movable hopper bottom movably supported at one end remote from the cylinder, the opposite end nearest the cylinder being free, said bottom being disposed at an incline from a horizontal plane and traversible by vine material entering at its movably supported end and passing toward said free end, retarding comb teeth stationarily mounted beneath said bottom and adjacent to said free end and being adapted for obstructing said passage of vine material, said bottom being slotted in from the free end and having the slots open at said end being directed away from said movably supported end and in registration with the teeth, the downward movement of the bottom by force of pressure of said vine material caused by the pull thereon by said cylinder, introducing the teeth into the slots to work accumulations in the slots out of the open ends thereof.

3. In a feeder, a movable hopper bottom movably supported at one end, the opposite end being free, retarding blades stationarily mounted beneath said bottom and adjacent to said free end, said bottom being slotted in from the free end and having the slots in registration with the blades, the downward movement of the bottom introducing the blades into the slots to comb accumulation in the slots out of the open ends thereof, said blades being in the form of right-angled triangles, the perpendicular to each base being closely spaced from the inner end of the respective slot and the respective hypotenuse or pitched side facing the open end of the slot.

4. In a feeder, a movable hopper bottom movably supported adjacent to one end, the opposite end being free, retarding blades to coact with said free end, said bottom being slotted in from the free end and in registration with said blades, a spring anchored at one end, an arm rigid on the bottom and having the other spring end attached thereto so as to swing the bottom away from the blades, and a bar fixed in position between said arm and bottom, fixedly carrying the blades and acting as a stop for the arm.

5. A feeder comprising a hopper including sides and a bottom, one of the vertical ends of the hopper being open, a revoluble picking cylinder journaled closely to the hopper and having its toothed perimeter extending into said open end so as to virtually constitute a wall at said end for the hopper, deflector means overlying the picking cylinder in fixedly spaced relationship to its toothed perimeter, and a section movably attached to the bottom of said deflector means, being adapted to gravitate to a resting position below a theoretical extension of said deflector means beyond the cylinder tooth area thereby supporting the free edge of said extension in chordal relationship to the tooth-area of said cylinder thus to increase the available size of the hopper entrance.

6. A feeder comprising a hopper having sides and a bottom, one end of the hopper being open, a revoluble picking cylinder journaled closely to the hopper, having its toothed perimeter extending into the hopper and virtually forming a hopper wall at said end, an upwardly pitched deflector overlying the cylinder and defining a space of fixed dimensions above the cylinder to amply clear the tooth-area of said cylinder, a deflector section having means by which it is movably attached along the bottom edge of said deflector, and stop means limiting the gravitation of the movable deflector section to a point wherein the free edge of said section coincides with a vertical plane parallel to the axis of the cylinder and intersecting the tooth-area thereof, said plane forming the chordal demarcation of a tooth-area segment which is fully exposed in the hopper and provides for the immediate gripping of material introduced into said hopper.

7. A feeder comprising a hopper having fixed sides, a revoluble picking cylinder journaled closely to the hopper, that perimetric portion of the cylinder confronting the hopper constituting a movable end wall for the hopper, a hopper bottom movably mounted between the sides and having a free edge adapted to rise and fall adjacently to the cylinder, yieldable means adapted to support the movable bottom at a determined altitude in respect to the hopper, deflector means parallel to and overlying the cylinder and including a parallel pendant movable section having a free edge normally positioned on a chordal plane parallel to the cylinder axis and intersecting the tooth-area of the cylinder, defining a tooth-area segment to the interior of the hopper for exposure to material discharged substantially vertically into the hopper upon said bottom, and means coordinated with the movable bottom progressively projecting through said bottom as said bottom is depressed by the pulling action of the teeth in said segment upon the material.

8. In a feeder, a movable hopper bottom movably supported at one end, the opposite free end of said bottom being slotted in from the free end so that the slots are open at said end, a bar fixedly mounted adjacently to said free end, a series of spring fingers carried by said bar, said fingers having shanks terminating in pitched ends in registration with said slots, and resilient means pulling on the bottom to limit its raised position whereat the extremities of said pitched ends are flush with the top of the bottom in said slots, the pitched ends extending progressively through said slots and above the bottom as the bottom is depressed against the tension of said means.

CARL R. LIVERMON.